United States Patent
Boss et al.

(10) Patent No.: US 7,498,954 B2
(45) Date of Patent: Mar. 3, 2009

(54) COOPERATIVE PARKING

(75) Inventors: Gregory Jenson Boss, American Fork, UT (US); Rick Allen Hamilton, II, Charlottesville, VA (US); Andrew R. Jones, Round Rock, TX (US); Kevin C. McConnell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 11/421,465

(22) Filed: May 31, 2006

(65) Prior Publication Data
US 2007/0282489 A1    Dec. 6, 2007

(51) Int. Cl.
*B60Q 1/48* (2006.01)
*G08G 1/14* (2006.01)

(52) U.S. Cl. .................. 340/932.2; 340/435; 340/436; 340/3.1

(58) Field of Classification Search ............... 340/932.2, 340/435, 436, 3.1
See application file for complete search history.

(56) References Cited

U.S. PATENT DOCUMENTS

| | | | |
|---|---|---|---|
| 4,486,140 A | 12/1984 | Klaus | |
| 5,091,727 A | 2/1992 | Mahmood | |
| 5,303,961 A | 4/1994 | Popil | |
| 5,845,268 A | 12/1998 | Moore | |
| 5,910,782 A | 6/1999 | Schmitt et al. | |
| 5,945,907 A | 8/1999 | Yaron et al. | |
| 6,104,314 A * | 8/2000 | Jiang | 340/932.2 |
| 6,147,624 A | 11/2000 | Clapper | |
| 6,163,253 A | 12/2000 | Yaron et al. | |
| 6,646,568 B2 | 11/2003 | MacPhail et al. | |
| 6,776,117 B2 | 8/2004 | D'Onofrio | |
| 7,043,346 B2 * | 5/2006 | Kubota et al. | 701/28 |

FOREIGN PATENT DOCUMENTS

EP    1217386 A2    6/2002

* cited by examiner

*Primary Examiner*—George A Bugg
*Assistant Examiner*—Travis R Hunnings
(74) *Attorney, Agent, or Firm*—Ojanen Law Offices Ltd.

(57) ABSTRACT

A system, a method, and a service for cooperative parking between vehicles. A parking vehicle has a transmitter to send a parking signal to parked vehicles in proximity to a parking space. A parked vehicle receives the parking signal, activates one or more position sensors mounted on the parked vehicle, activates its engine or auxiliary motor, disengages any locking mechanism such as brakes or the transmission, and moves itself away from the parking space. Once the parking vehicle has parked successfully or after a predetermined time delay, the parked vehicle may move to a position closer to the parking vehicle but still far enough away to avoid collision as determined by the position sensor and turn off its engine or auxiliary motor and re-engage its locking mechanism. The cooperative parking system may include a switch and a transmitter, either contained within a hand-held programmable device or within the parking vehicle. Preferably, all vehicles have the transmitter and the receiver to activate and respond to parking requests.

6 Claims, 3 Drawing Sheets

COOPERATIVE PARKING

FIELD OF THE INVENTION

This invention relates generally to the field of parking motor vehicles, and particularly relates to a system wherein the parked and unparked vehicles cooperate with each to achieve optimal use of the space for parking vehicles.

BACKGROUND OF THE INVENTION

Other than parking garages or parking lots, the preferred parking on streets for motorized vehicles is in a parallel arrangement because it uses the minimum amount of the street width which in turn allows more space for moving traffic. Parallel parking occurs when all the parked vehicles are parallel to the direction of traffic adjacent the curb or at the far edges of the street. Indeed, parallel parking has become so prevalent in the United States that many states will test a driver's skill at parallel parking in order to receive a driver's license. Parking a motor vehicle in a parallel parking space can often lead to frustration and physical damage when maneuvering a vehicle into a parallel parking space. Thus, some unskilled drivers will forego a space into which they must parallel park and continue to drive until they can find a parking lot or garage or until a space at the front end or the back end of a line of parallel parked vehicles becomes available.

During the process of parallel parking, the repetitive action of moving forward and backwards to maneuver the vehicle into a tight space can cause physical strain, mental stress, and physical damage as drivers try to perform a difficult parallel park. Further some parking spots are not large enough for a target vehicle to use but could easily accommodate that target vehicle if the space between surrounding vehicles were used more efficiently. By way of example only, there is a television advertisement whereby an adolescent passes the parallel parking portion of his driver's license test by backing into the parking space and ramming the vehicle behind the parking vehicle to move it, then the teen puts the vehicle into forward gear and rams the vehicle in front of the parking vehicle to move it. And then the teen centers the vehicle in the space but the vehicles in front of and behind the parked vehicle are wrecked. Accordingly, there exists a need in the streets of America to enable parallel parking to become easier for an exasperated driver and/or tester, and to overcome the deficiencies and limitations described above.

SUMMARY OF THE INVENTION

These needs and other advantages that will become apparent are solved by an arrangement and a method and a service that allows drivers wanting to parallel park to request unoccupied surrounding vehicles to move forward and/or backwards in order to increase the space available to the requesting vehicle and then subsequently allows the surrounding vehicles to return to their original position. In one aspect of the invention, a cooperative parking system comprises a switch to initiate the cooperative parking system; and a transmitter connected to the switch, the transmitter to transmit a park signal to a receiver.

In another aspect of the invention, a cooperative parking system in a parked vehicle may comprise a receiver to receive a park signal; a position sensor connected to the receiver; and a motor capable of moving the parked vehicle without a driver to a position determined by the position sensor in response to the park signal.

The switch connected to the transmitter may be physically located in a parking vehicle, the switch causing the transmitter to transmit the park signal to a parked vehicle indicating that the driver wishes the parked vehicle to accommodate the parking vehicle. The switch may be manually operated by a driver of the parking vehicle, may be integrated into an on-board computer within the parking vehicle, or may be a portable electronic processing device.

Another aspect of the invention is a method of cooperative parking, comprising the steps of: transmitting a park signal; at least one parked vehicle receiving the park signal; activating a position sensor in the at least one parked vehicle; activating a motor in the at least one parked vehicle; the motor in the at least one parked vehicle moving its respective parked vehicle away from a source of the transmitted signal until the position sensor indicates there is no further room. The method may further comprise the steps of transmitting a second park signal; the motor in the at least one parked vehicle moving its respective vehicle closer to the source of the transmitted signal until the position sensors of the at least one parked vehicle indicates there is sufficient space; and turning off the motor in the at least one parked vehicle.

Still yet another aspect of the invention is a computer program product in a computer-readable medium, for encoding a processing device within a vehicle to enable cooperative parking, comprising: instructions to receive a parking signal emitted from a transmitter; instructions to activate a position sensor in response to the parking signal; instructions to disengage a parking brake on the vehicle, if engaged; instructions to disengage a transmission on the vehicle, if engaged; instructions to move the vehicle away from a source of the parking signal until the position sensor indicates there is no more room; instructions to wait; instructions to move the vehicle toward the source of the parking signal until the position sensor indicates to stop movement; instructions to engage a parking brake, if any; and instructions to engage the transmission into a parked gear. The computer program product in a computer-readable medium may further comprise instructions to return the vehicle to its original position; instructions to engage a parking brake, if any; and instruction to engage the transmission into a parked gear.

It is further envisioned that the invention may be considered a method for providing a parking service, comprising: responding to a request to park a vehicle into a parking space; transmitting a park signal to at least one parked vehicle closest to the parking space; activating a position sensor; communicating to the at least one parked vehicle to move away from the parking space in response to the park signal until the position sensor indicates there is sufficient room to park the vehicle in the parking space.

BEST MODE FOR CARRYING OUT THE INVENTION

Figure 1:
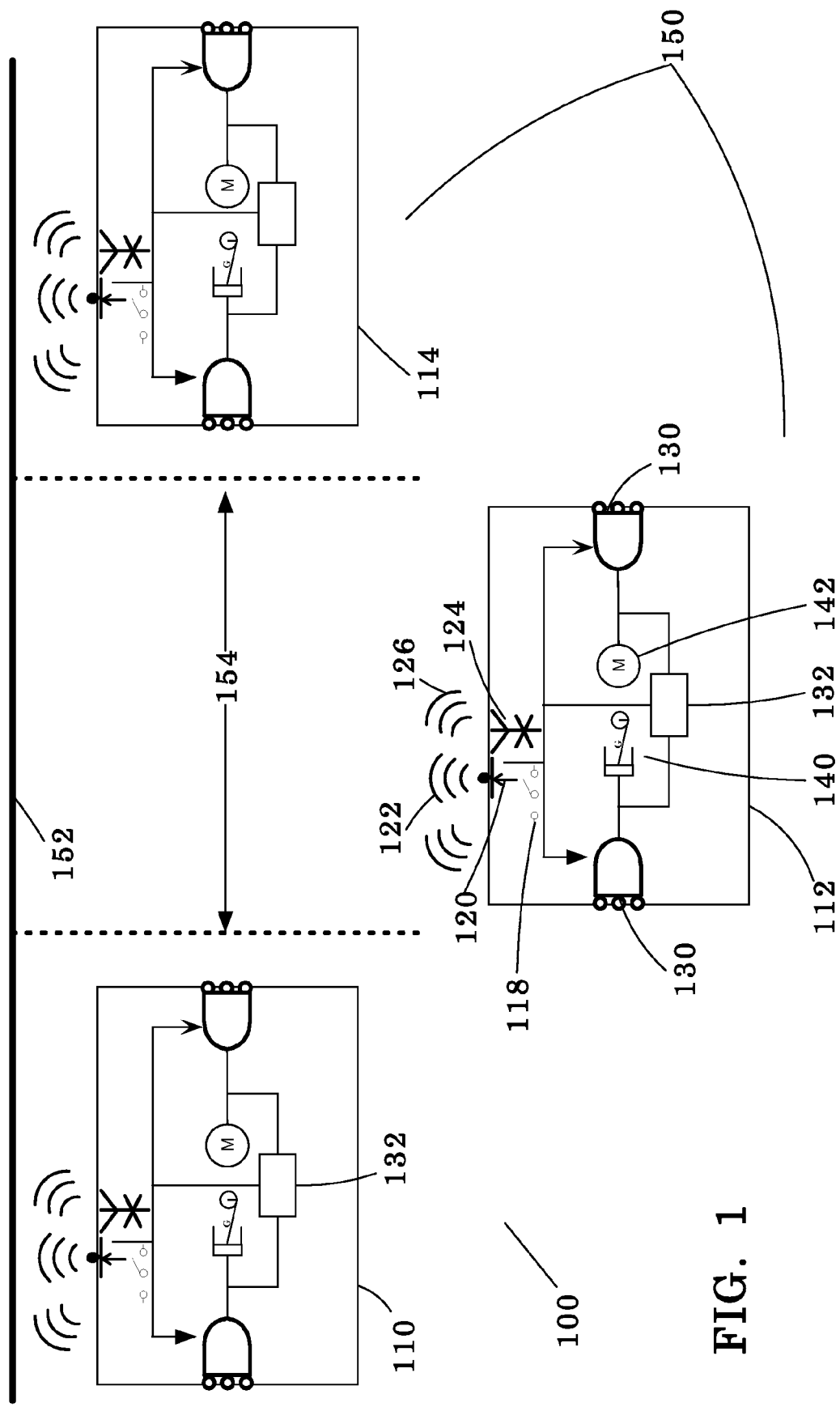
FIG. 1 is a simplified block diagram of the components of a cooperative parking system in accordance with an embodiment of the invention.

The cooperative parking system of the invention is now described in detail. In general, a preferred embodiment with a presently known best mode for making and using the cooperative parking system is described. Alternative embodiments are similarly described for various parts of the cooperative parking system. With respect to FIG. 1, there is shown a block diagram of the elements comprising a cooperative parking system 100. Vehicles 110, 114 are parked on a street 150 in a parallel arrangement along a curb 152. Preferably, all vehicles 110, 112, 114 have a cooperative parking system installed. Each vehicle 110, 112, 114 having the cooperative parking system has a switch 118 that may be activated by the driver or by the ignition or both or some other mechanism within the vehicle. A transmitter 120 emits a Parking signal 122 to surrounding vehicles 110, 114 in response to activation of the switch 118. The Parking signal 122 may be a laser, infrared, radio frequency identification, ultrasonic, or other wireless signal. The Parking signal 122 indicates that a vehicle 112 is in the vicinity and wishes to obtain sufficient room to park in parking space 154.

Switch 118 and transmitter 120 may also be integrated into an on-board computer 132 having program instructions to implement the processes described herein. Alternatively, switch 118 and transmitter 120 may be implemented in a portable device separable from the vehicle 112, similar to a garage opener. The portable device, moreover, may be a programmable device such as a cellular telephone, personal digital assistant, a laptop or other portable logic device having program instructions capable of causing surrounding vehicles 110, 114 to respond to the transmitted Parking signal 122 in accordance with the method steps described herein.

A receiver 124, also part of the cooperative parking system, in each neighboring vehicle 110, 114 responds to the Parking signal 122 by activating position sensors 130. Position sensors 130 are preferably mounted on each vehicle to survey a surrounding area within a circumscribed distance and are intended prevent a collision of the vehicle upon which they are mounted with any other vehicles or any other object, such as parking meters, poles, etc. While position sensors 130 are shown on the front and the rear of each vehicle, other arrangements of position sensors are known in the art. Examples of such position sensors 130 may include those described in U.S. Pat. No. 6,163,253 entitled METHOD AND APPARATUS FOR GUIDED PARKING OF A VEHICLE USING ULTRASONIC POSITION DETECTION to Yaron et al., or EP1217386A2 entitled DISTANCE MONITORING SYSTEM BETWEEN TWO VEHICLES to Kupfernagel et al. If sufficient space is available proximal to the neighboring vehicles 110, 114 such that they can "squeeze" together without collision to allow vehicle 112 to park in parking space 154, the neighboring vehicles 110, 114 may start their respective engines 140 or an auxiliary electric motor 142 specifically designed to unlock the parking brake and transmission of each respective vehicle, straighten the wheels of each respective vehicle, and move the neighboring vehicles forward or backward in order to provide adequate parking space 154 for the parking vehicle 112, while still preventing collision with any other vehicle or obstacle.

An on-board computer 132 in the surrounding vehicles 110, 114 may have program instructions or be capable of receiving wireless program instructions to allow vehicles 110, 114 to participate in cooperative parking. On-board computer 132 could then be programmed to control the receiver 124, the position sensors 130 and respond accordingly to further activate the engine 140 or auxiliary electric motor 142, disengage the transmission and/or parking brake, etc. The on-board computer 132 may be a dedicated ASIC but, preferably, is an existing on-board computer 132 of the vehicle that may be programmed by program product instructions to perform the tasks and processes discussed herein. As mentioned, the program instructions may be input from a diskette, portable memory, transmitted wirelessly from vehicle 112 or a portable device within vehicle 112, or transmitted wirelessly from other sources, such as an ON-STAR system.

The apparatus of the cooperative parking system 100 in the surrounding vehicles 110, 114 then delay while the parking vehicle 112 is manually or automatically parked. One such automatic parking system is described in U.S. Pat. No. 6,104,314 entitled AUTOMATIC PARKING APPARATUS to Jiang. Once vehicle 112 is parked in space 154, the driver may activate the parking switch 118 connected to transmitter 120 which in turn transmits a Parked signal 126 to neighboring vehicles 110, 114. Parking signal 122 and Parked signal 126 may be distinguished from each either by alternating in time, by frequencies, by other identification known in the art. The receivers 124 receive the Parked signal 126, and the on-board computer or other logic 132 may activate the position sensors 130 to determine the distances between the adjacent vehicles 110, 114 and the parking vehicle 112. And then again, logic or an on-board computer 132 may control the engine 140 or the auxiliary electric motor 142 to move the neighboring vehicles forward or backwards a safe distance, turn the wheels back towards the curb or to the initial orientation, and stop the engine 140 or auxiliary motor 142.

One embodiment of the cooperative parking system 100 contemplates that the Parking signal 122 would be received only by the immediately adjacent vehicles 112 and 114. Another embodiment of the cooperative parking system 100 contemplates that the Parking signal 122 from vehicle 112 could be broadcast so that all vehicles within range may be requested to move. Alternatively, yet another embodiment contemplates that neighboring vehicles 112, 114 adjacent to the parking vehicle 112 requested to move may in turn send out a Parking signal 122 to its closest neighboring vehicles 116 and 118 in front or behind of these vehicles 110, 114 to also move forward or backward. This cascading effect would provide additional space to the empty spot allowing for an easier or possible parallel parking.

Figure 2A:
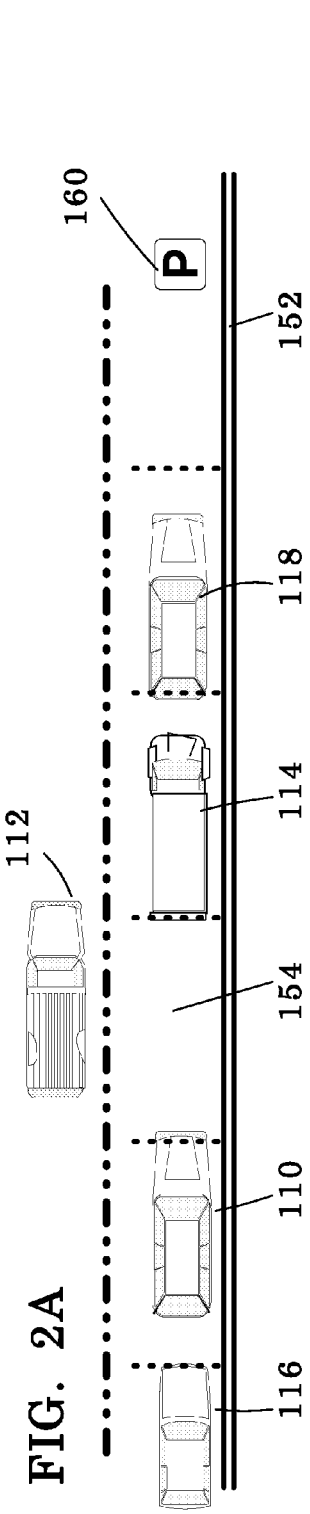
FIGS. 2a, 2b, and 2c are simple graphical illustrations of the use of a cooperative parking system. It is suggested that FIG. 2 be printed on the face of the patent.
Figure 2B:
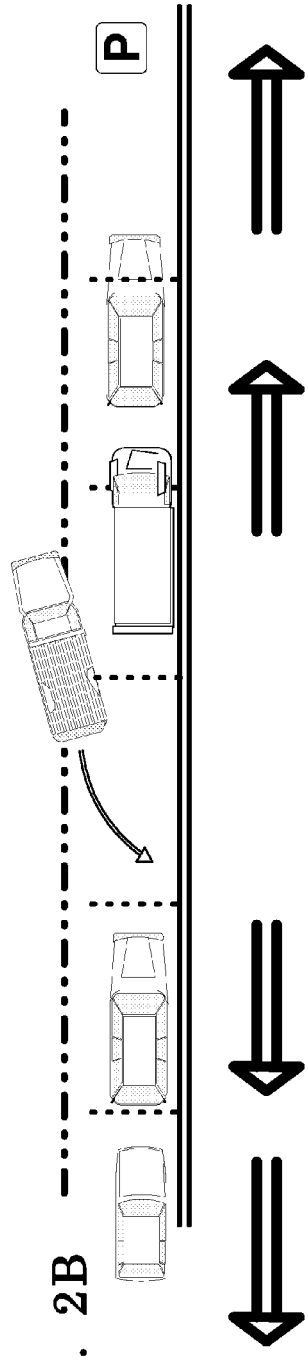
Figure 2C:
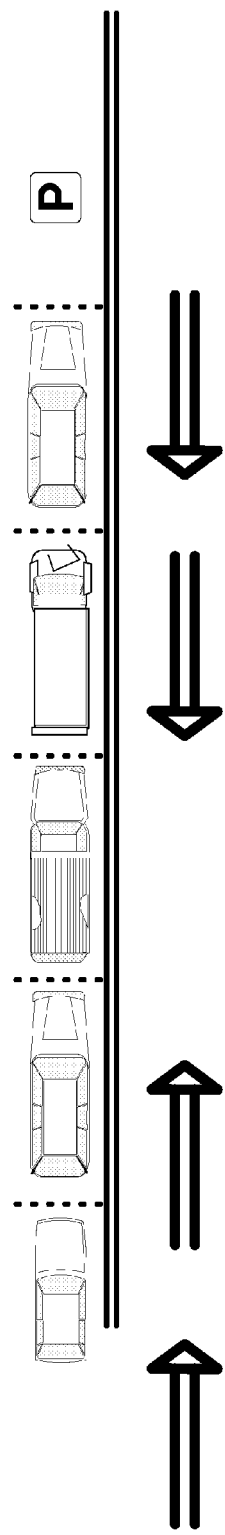
Figure 3:
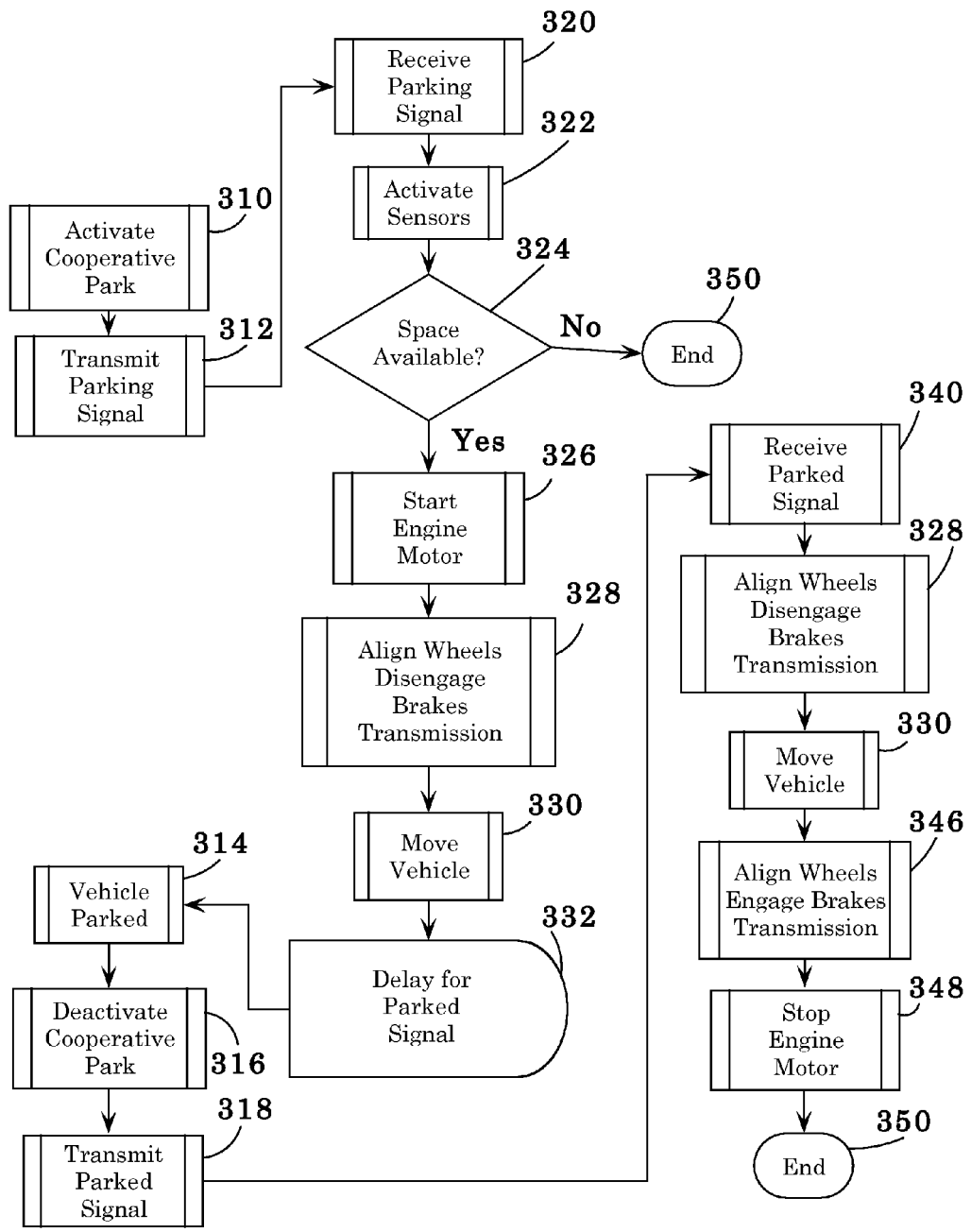
FIG. 3 is a simplified flow chart of the process by which the cooperative parking system implements optimal parking of a vehicle.

Viewing FIGS. 2 and 3 together provides a simplified logic flow diagram of the method of implementing and using the cooperative parking system 100. In step 310, a vehicle 112 approaches a open parking space 154 into which she/he wishes to park. In FIG. 2a, vehicles 116, 110, 114 and 118 are in a static or Parked state. In step 312, the driver activates the parking switch 118, whether the switch is in the vehicle 114 or on a portable device, which in turn activates a transmitter 120, which may be a directional transmitter, to transmit a Parking signal 122 to the surrounding vehicles 110, 114 or to 110, 114, 116, and 118, depending upon the range and embodiment.

In step 320, the proximal surrounding vehicles 110, 114 or 116, 110, 114, and 118 receive the transmitted Parking signal 122. The surrounding vehicles activate their position sensors 130 in step 322 to determine if space is available in step 324.

There are several methods by the position sensors 130 may determine if sufficient space is available. One such method is that the position sensor 130 determines if there is an object to the right of vehicle 112. The position sensor 130 is preferably calibrated to determine if any obstacle or person is within the periphery of the vehicle on any side. As vehicle 112 traverses beyond the rear of vehicle 116 the position sensor registers a change in depth from ten feet to three feet. At this point two options exist for measuring distance. Preferably, the on-board computer 132 resets a special odometer (not shown) dedicated to the cooperative parking system capable of measuring distances with which the cooperative parking system is concerned, e.g., a range of one inch to fifteen feet. Optionally, an on-board computer 132 may start a timer and simultaneously record the vehicle's speed. After the position sensor 130 of vehicle 112 passes by the front portion of vehicle 116, the position sensor registers another significant change from, e.g., three feet to ten feet. Now, the length of vehicle 116 can be calculated by recording the current odometer reading. The on-board computer 132 in vehicle 112 resets the odometer and as vehicle 112 passes by the rear of vehicle 110 the position sensor registers the change in depth and records the current odometer position. The length of the space between vehicle 116 and 110 is then calculated. This process repeats until an open space is found. If vehicle 112 passes by the rear of vehicle 118 before stopping and reversing to park in space 154 then there will be a length of three vehicles and four open space lengths that are known and can be used for the calculation.

Yet another preferred method of determining if there is sufficient space in which to park uses measurements taken by the position sensors 130 on each of the vehicles 116, 110, 114, 118. Those measurements may be broadcast back to vehicle 112. Thus, it is contemplated that vehicle 116 measures the distance behind it to the nearest obstacle; vehicle 110 measures the distance between it and vehicle 116; vehicle 114 measures the distance between it and vehicle 110, and so on. When vehicle 112 transmits the Parking signal 122, each vehicle 116, 110, 114, 118 activates its position sensors 130 and transmits a response to vehicle 112 of how much space is available. The on-board computer 132 of vehicle 112 sums the available space less any buffer space and determines if that distance is greater than the distance needed to parallel park. The buffer space is a predetermined value the owner of each vehicle 116, 110, 114, 118 may set or, optionally, may be previously set to a distance that allows for a minimum distance between two vehicles, which minimum distance might be one inch or may be two feet, for example, so that in this way the vehicle will never get closer than one inch or two feet, whatever distance is set, from the surrounding vehicles. Further the distance needed to parallel park will be some distance slightly greater than the length of the vehicle 112 because the vehicle approaches the parking space 154 at an angle. This required parking distance can also be programmed into the on-board computer 132 or the portable device having the switch and transmitter by the manufacturer or by the owner of vehicle 112 according to preferences. The communication of the available space from each of the vehicles 116, 110, 114, 118 would return to vehicle 112 in the same manner that it was received, either directly or via a serial connection, i.e., vehicle 112 sends Parking signal 122 to vehicle 114 which in turn sends the signal to vehicle 118, then vehicle 118 responds back to vehicle 114, which in turn responds back to vehicle 112, etc.

However determined, if space is available, an on-board computer or other logic may activate the vehicles' engine or auxiliary motor in step 326 and mechanically or hydraulically release the parking brake, override the transmission and straighten the vehicles' wheels in step 328. The engine or auxiliary motor then moves its respective vehicle either forward or backward as in step 330 until position sensors determine the motion is sufficient to allow parking and still prevent collision.

The engine or auxiliary motor then stops the movement of its respective vehicle and, in step 332, the vehicles 110, 114 or 116, 110, 114, 118 remain in an idling or delay state, awaiting a Parked complete/return signal 126 from the requesting vehicle 112. The driver of the parking vehicle 112 then parks the vehicle. This step is shown in FIG. 2b.

The original driver, completes his/her parking procedure in step 314, and then either manually or automatically reactivates switch 118, as in step 316. The cooperative parking system sends a Parked signal 126 to surrounding vehicles 110, 114 or 116, 110, 114, 118 in step 318. The surrounding vehicles 110, 114 or 116, 110, 114, 118 receive the Parked signal 126 in step 340. The on-board computer of each respective vehicle then mechanically or hydraulically straightens the vehicles' wheels, unlocks the transmission and/or parking brake in step 328, and moves the vehicle either forward or backward to reposition its respective vehicle into its respective parking space in step 330. This process is illustrated in FIG. 2c. The on-board computer turns the vehicles' wheels towards the curb, and may set the parking brake and transmission in step 346 and then turn off the engine or auxiliary motor in step 348.

It will be appreciated that variations of some elements are possible to adapt the cooperative parking system for specific conditions or functions. In one embodiment, the cooperative parking system 100 may permit a similarly equipped vehicle to opt out of cooperative parking if the owner choose to do so. In another embodiment the vehicles may have override circuitry that engages the cooperative parking system based on city ordinances. In this case, "Cooperative Parking Zones" signs 160 might be posted in areas so that owners know that cooperative parking is enforced and there is a possibility that their vehicles could be moved. Such enforcement could be implemented with wireless signals emanating from a street light, a parking meter, or other device within the curb or otherwise located on the street that could override any "opt out" lock on the engine.

Still yet, any of the components of the embodiments could be deployed, managed, serviced by a service provider who enables cooperative parking of surrounding vehicles when, for instance, the Parking vehicle may not be equipped with the cooperative parking system described above. There may be a metered or other method of payment in the vicinity whereby a cooperative parking service could be activated. Similarly, such cooperative parking services may be rendered by emergency vehicles to move parked vehicles near or adjacent to a fire hydrant or for any other emergency, or by a tow truck service to remove vehicles from very "tight" spaces.

The cooperative parking system can also be used to move neighboring vehicles during an exit from the parking space using the same procedure. In this instance, a driver would enter her/his vehicle, activate the parking switch 118 which in turn causes transmitter 120 to emit a Parking signal 122. Surrounding vehicles, as before either 110, 114 or 116, 110, 114, 118 would then receiving the Parking signal 122, turn on their position sensors 130 and their engines 140 or auxiliary motors 142, release any braking or locking mechanism and move closer or squeeze together and then wait or delay for a second Parked signal. It is envisaged that these actions could be controlled and coordinated by the on-board computer. Once the driver has safely removed her/his vehicle from the parking space 154, he/she can press parking switch 118 again to generate a Parked signal 126 and drive away. The idling vehicles then receive the Parked signal 126. At this time, if there is sufficient space between the remaining vehicles, the engine 140 or auxiliary motor 142 may just turn off, engage any locking or braking mechanism and realign the wheels. Otherwise, the remaining vehicles may reposition themselves in their respective parking space or otherwise move to be within a predetermined distance from every other adjacent vehicle or obstacle.

It is contemplated, moreover, that a person parking or removing her/his vehicle from a parking space may forget to reactivate the switch once parked, or forget to press the switch once she/he leaves the parking space; in which case, the adjacent vehicles may be left in the delay or idling state indefinitely. In this instance, it may be preferable to connect switch 118 to the transmission such that when a vehicle is parked, the switch automatically connects to the transmitter and emits a Parked signal 126 when the transmission is put in Parked gear. When leaving the parking space, the switch may be automatically activated and the Parked signal 126 may be automatically transmitted when the driver puts her/his vehicle into Drive gear so that the remaining vehicles may return to the static or parked state. Alternatively, there may be a time delay for the amount of time required to park, e.g., on the order of up to five to ten minutes, before the remaining vehicles go to the static or parked state.

While described herein as a parking meter system, the concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method of cooperative parking, comprising the steps of:
   transmitting a park signal;
   at least one parked vehicle receiving the park signal;
   activating a position sensor in the at least one parked vehicle;
   activating a motor in the at least one parked vehicle;
   the motor in the at least one parked vehicle moving its respective parked vehicle away from a source of the transmitted signal until the position sensor indicates there is no further room.

2. The method of cooperative parking of claim 1, further comprising: parking a parking vehicle in proximity to the at least one parked vehicle.

3. The method of claim 1, further comprising:
   transmitting a second park signal;
   the motor in the at least one parked vehicle moving its respective vehicle closer to a source of the second park signal until the position sensors of the at least one parked vehicle indicates there is sufficient space;
   turning off the motor in the at least one parked vehicle.

4. The method of claim 3, further comprising:
   transmitting a third park signal;
   the motor in the at least one parked vehicle moving its respective vehicle away from a source of the third park signal until the position sensor of the at least one parked vehicle indicates there is no more room.

5. A method for providing a parking service, comprising:
   responding to a request to park a vehicle into a parking space;
   transmitting a park signal to at least one parked vehicle closest to the parking space;
   activating a position sensor;
   communicating to the at least one parked vehicle to move away from the parking space in response to the park signal until the position sensor indicates there is sufficient room to park the vehicle in the parking space.

6. The method for providing a parking service of claim 5, further comprising:
   communicating to the at least one parked vehicle to idle while the vehicle is parked in the parking space; and
   communicating to the at least one parked vehicle to move towards the parking space until the position sensor indicates there is adequate room between the at least one parked vehicle and the vehicle in the parking space.

* * * * *